Jan. 15, 1957 J. E. BRIDGES 2,778,009
ENCODING MECHANISM FOR A SUBSCRIPTION TYPE
OF COMMUNICATION SYSTEM
Filed Feb. 20, 1953 4 Sheets-Sheet 1

JACK E. BRIDGES
INVENTOR.
BY Francis W. Crotty
HIS ATTORNEY.

JACK E. BRIDGES
*INVENTOR.*
BY Francis W. Crotty
HIS ATTORNEY.

ENCODING MECHANISM FOR A SUBSCRIPTION TYPE OF COMMUNICATION SYSTEM

Filed Feb. 20, 1953 4 Sheets-Sheet 3

JACK E. BRIDGES
*INVENTOR.*

BY Francis W. Crotty

HIS ATTORNEY.

JACK E. BRIDGES
*INVENTOR.*
BY Francis W. Crotty
HIS ATTORNEY.

United States Patent Office 2,778,009

Patented Jan. 15, 1957

2,778,009

ENCODING MECHANISM FOR A SUBSCRIPTION TYPE OF COMMUNICATION SYSTEM

Jack E. Bridges, Franklin Park, Ill., assignor to Zenith Radio Corporation, a corporation of Illinois Application February 20, 1953, Serial No. 337,969

1 Claim. (Cl. 340—348)

This invention relates to the encoding apparatus of a subscription type communication system, such as a subscription television system. The encoding portion of such a system constitutes the arrangement at the transmitting station which effects coding of the communication to introduce an aspect of secrecy and is the deciphering or decoding arrangement of the receiver which permits the receiver to derive the intelligence of the transmission. While such a mechanism may be advantageously employed in a variety of systems, it is particularly suited for use in a subscription television system and will be described in that environment.

A number of different forms of subscription television systems have been proposed; a particularly attractive one is described and claimed in copending application Serial No. 327,576, filed December 23, 1952, in the name of Robert Adler et al. and assigned to the same assignee as the present invention. In the Adler et al. arrangement which features what is referred to as "a coded-code technique," the coding mechanism switches the operation of the transmitter from one mode to another at spaced operating intervals in accordance with a coding pattern and information disseminating that pattern to authorized receivers is included in the radiation but in coded form. More specifically, during each of a number of mode-determining intervals, a random number of code components is applied to the selector mechanism of the coding arrangement, and these components are concurrently transmitted to authorized receivers as separated bursts of a key-signal frequency included in a coded television signal. The selector mechanism selects a particular combination of those components and applies them to an even-odd counter which determines whether there has been a selection of an even or an odd number of such components. Where the selection is of an even number of components, the transmitter operates in one mode for the ensuing period, and where the selection is of an odd number, the operation follows an alternate mode.

At the receiver where the key-signal bursts are separated from the received coded television signal, a similar type of selector mechanism included in the decoding arrangement accomplishes the same selection as at the transmitter and a similar even-odd counter responds to the selected components to control the operating mode of the receiver. In this manner, mode changes are introduced into the receiver to effect decoding of the coded telecast and permit intelligent image reproduction even though the radiation is unintelligible to receivers not equipped with the encoding mechanism and the interpreting information required for its operation.

The present invention concerns itself more particularly with the selector unit of the encoding mechanism and is a practical answer to the difficult problem of providing the system with the degree of secrecy required for the successful commercial operation of such a system.

It is a primary object of this invention to provide a new and improved encoding apparatus for a subscription type of communication system.

It is a specific object of the invention to provide an improved encoding apparatus for achieving the maximum number of permissible encoding combinations from a given number of controlled elements but with a minimum number of adjustments.

In accordance with the invention, an encoding apparatus is provided for a subscription type of communication system and comprises a plurality of groups of similar switch elements, each group representing $(m)^n$ possible switching combinations, where $m$ is the number of operating positions of each switch element in any group and $n$ is the number of such elements included within any such group. There are N separate input circuits each coupled to a different one of the switch elements, and common signal-translating means is connected to all of the switch elements. Additionally, there are a corresponding plurality of switch actuators individually associated with an assigned one of the aforesaid groups to effect actuation of the switch elements of such assigned group. Each such actuator has $(m)^n$ operating positions each of which establishes a selected one of the switching combinations in its assigned group of switch elements and the total number of switch elements in all of the groups is equal to N.

The features of this invention which are believed to be new are set forth with particularity in the appended claim. The invention, however, together with further objects and advantages thereof, may best be understood by reference to the following description in conjunction with the accompanying drawings, in which:

Figure 1:
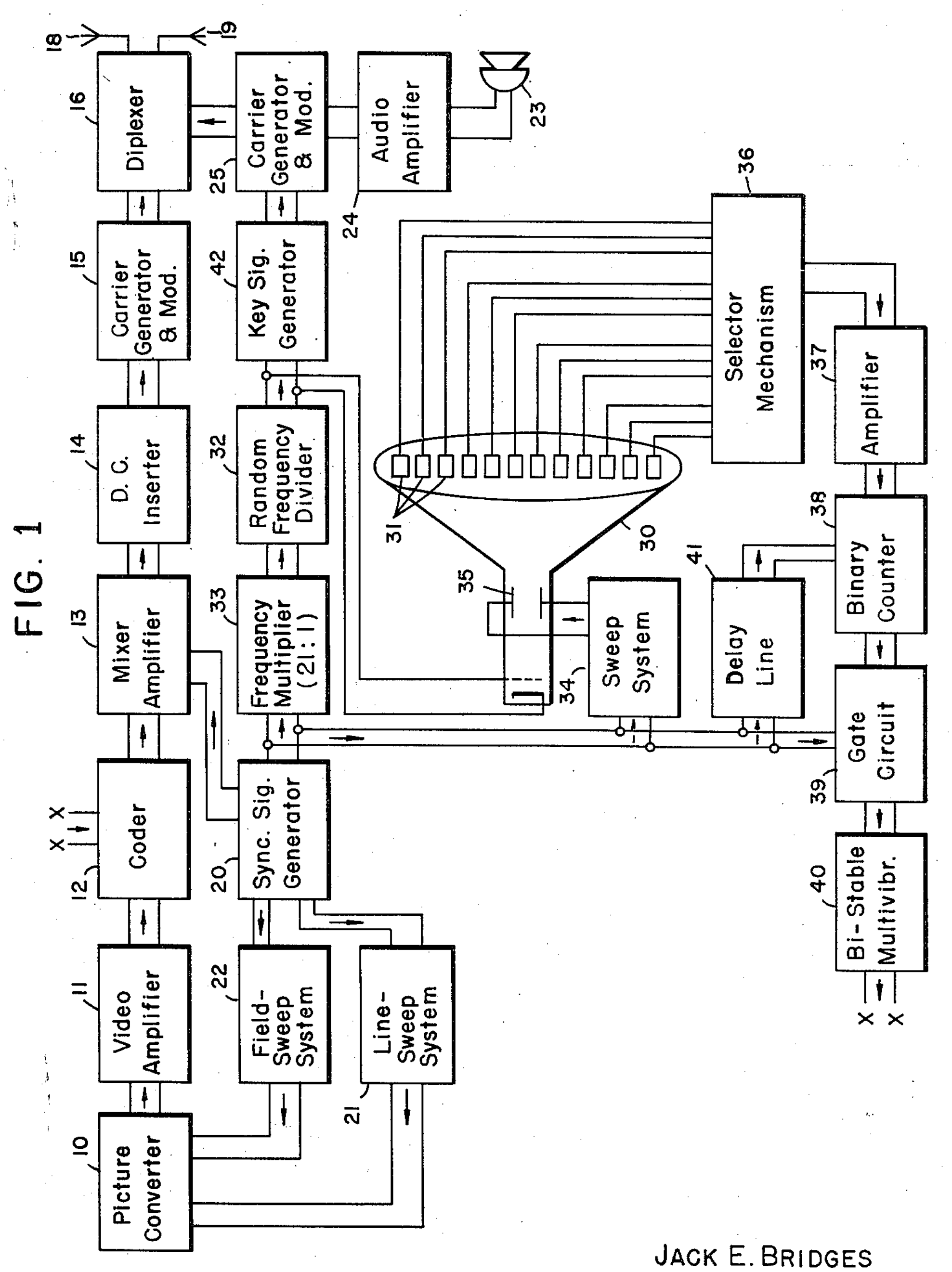
Figure 1 represents a subscription television transmitter incorporating one form of encoding apparatus in accordance with the invention.

Referring now more particularly to Figure 1, the subscription television transmitter there represented comprises a picture converter 10 which may be any conventional form of camera tube or pick-up device for generating video-frequency signal components representing the shade values of a scanned object to be televised. Connected in cascade to the output terminals of picture converter 10 and in the order named are a video amplifier 11 of any desired number of stages, a coder 12, a mixer amplifier 13, a direct-current inserter or restorer 14, and a carrier-wave generator and modulator 15 having output terminals coupled through a diplexer 16 to a suitable antenna system 18, 19.

As in any conventional television transmitter, there is a synchronizing-signal generator 20 for producing the usual line- and field-synchronizing and blanking or pedestal components employed in controlling scanning operations of picture converter 10 and in forming the composite television signal. The line-frequency output terminals of generator 20 are coupled to a line-sweep system 21 which supplies deflection signals of suitable wave form to the line-deflection elements of the picture converter. In similar fashion, the field-synchronizing terminals of generator 20 are coupled to a field-sweep system 22 which delivers field-scanning signals of appropriate wave form to the field-deflection elements of the picture converter.

The sound information accompanying the scene to be televised is picked up by a microphone 23 which is coupled to the input terminals of an audio amplifier 24 having output terminals coupled to a carrier-signal generator and modulator 25. Unit 25 is also coupled to the common antenna system 18, 19 through diplexer 16. The components of the transmitter identified thus far, with the exception of coder 12, constitute the usual elements of a conventional television transmitter. The added portions of the transmitter represented in the drawing are incorporated to effect subscription operation and in particular to code the transmission to the end that unauthorized receivers are not able to derive intelligence from the transmission.

The encoding apparatus includes a deflection-control tube 30 having a family of elemental anode segments 31 and an electrode system for developing an electron beam and for projecting that beam upon such anodes. As illustrated, there are 12 anode segments although it is more appropriate for the particular case under consideration to employ 20. The larger number has not been shown on the drawing since it would tend to confuse. A biasing arrangement (not shown) is preferably associated with the input electrodes of tube 30, tending normally to bias the tube to a condition of beam cut-off and the beam may be energized by pulse components of positive polarity applied to the input electrodes. For that purpose such electrodes are coupled to the output terminals of a random-frequency divider 32 having input terminals connected to a frequency multiplier 33. This multiplier, which may have a multiplication factor of twenty-one is coupled to field-drive output terminals of generator 20 which output terminals are further coupled to a sweep system 34 which, in turn, is coupled to, and supplies a deflection signal to, a pair of electrostatic deflection elements 35 included within deflection tube 30.

A selector mechanism 36 to be described more particularly hereinafter, has a series of input terminals, one for each elemental anode of deflection tube 30. The output terminals of the selector mechanism are connected through a pulse amplifier 37 to an even-odd counter 38 here represented as a conventional binary counter. The binary counter, in conjunction with a gate circuit 39, controls the operating condition of a bi-stable multivibrator 40 to develop through the actuator of the multivibrator, a deflection-control signal which is supplied to deflection-signal input terminals of coder 12. This connection is represented in the drawings by the terminal designations X—X. To effect this control, one pair of input terminals of gate circuit 39 is connected to the output terminals of counter 38 and another set of input terminals of the gate circuit are connected to the field-drive output terminals of generator 20, while the output terminals of the gate circuit are coupled to multivibrator 40. It is desirable from time to time to reset counter 38 to a reference condition and accordingly, reset pulses are supplied to reset terminals of the counter from a delay line 41 coupled between the field-drive output terminals of generator 20 and the counter.

It is further desirable, for the case under consideration, to include in the radiated signal some representation or manifestation of the selected coding components supplied to deflection tube 30 from frequency divider 32. This is accomplished by a key-signal generator 42 having a control circuit coupled to the frequency divider and having output terminals coupled to generator and modulator 25.

The described transmitter is essentially the same as that represented in Figure 1 of the above-identified Adler application and reference may be had thereto for a more complete discussion of the characteristics of its components and its mode of operation, such matters being considered here in only sufficient detail for a working understanding of the subscription transmitter. Before considering the operation, however, it is desirable to mention the characteristics of certain of the components even though most are of conventional design and construction.

Coder 12 is a beam-deflection tube having a pair of output circuits which may be selectively coupled to the video channel as the beam is deflected from one to the other of two segmental anodes coupled to such output circuits. One of these circuits includes a non-reflecting time-delay network so that the timing of the video components relative to the synchronizing components varies as the beam of the deflection tube is switched between anodes. This switching effect is accomplished by means of a beam-deflection control signal applied to the coder and the variations in timing of the video components relative to the synchronizing components codes the television signal since conventional receivers not equipped with decoding apparatus operated in accordance with the coding schedule are not able to reproduce a faithful image in response to the radiation. Viewed from the standpoint of operating modes, coder 12 has two stable operating conditions, each of which imposes a different operating mode on the transmitter. In its first operating condition, the coder extends the video channel to mixer 13 without introducing any material delay and in this condition the transmitter operation is conventional especially in respect of the time relation of the video and synchronizing components of the radiated signal. In its second operating condition, the coder introduces a time delay in the video channel and the transmitter then functions in an abnormal mode since the video and synchronizing components of the radiated signal have an abnormal time relation relative to one another.

Random-frequency divider 32 is preferably constructed in the manner of Patent 2,588,413 issued on March 11, 1952, to E. M. Roschke and assigned to the present assignee.

Binary counter 38 may take the form of an Eccles-Jordon type of multivibrator characterized by the fact that successive pulses of given polarity applied thereto trigger the circuit from one to the other of its operating conditions.

Gate circuit 39 is of the normally-closed type but translates field-drive pulses under the conjoint control of those pulses and the output signal from the binary counter. During any mode-determining interval of the transmitter in which the counter is in its first operating condition, such pulses are translated through the gate circuit with one polarity, while they are translated with the opposite polarity in any mode-determining interval in which the binary is in its alternate operating condition.

Multivibrator 40 is a mono-stable circuit sensitive to applied pulses of either polarity. Once it is triggered to a particular one of its two operating conditions by a pulse of given polarity, it can only be restored to its alternate operating condition by a pulse of the opposite polarity.

The operation frequency of generator 42 is preferably superaudible so that there is no conflict resulting from the conjoint modulation of the key signal and the audio information in unit 25. Moreover, generator 42 includes a cycling circuit so that once the generator is tripped by a pulse from divider 32, it develops a burst of key-signal energy having a duration which is less than the time separation of successive pulses obtained from the frequency divider.

In considering the operation of the transmitter, the technique of coding will be disregarded initially. Video-frequency components developed in picture converter 10 under the influence of scanning signals from sweep systems 21 and 22 are amplified in video amplifier 11 and supplied through coder 12 to mixer 13 which also receives line- and field-synchronizing and blanking pulses from generator 20 to develop a composite television signal. That signal is adjusted as to background level in D. C. inserter 14, amplitude-modulated on a picture carrier in unit 15 and applied through diplexer 16 to antenna 18, 19 for radiation to subscriber receivers. At the same time, the audio information associated with the scene is picked up by microphone 23 and, after amplification in amplifier 24, is frequency-modulated on a sound carrier in unit 25. The modulated sound carrier is applied through diplexer 16 to the antenna system for concurrent radiation with the video carrier.

To effect coding, field-drive pulses from generator 20 are multiplied in multiplier 33 and are delivered to random-frequency divider 32 which makes a random selection thereof and applies the selected multiplied pulses to the input electrodes of deflection tube 30. These pulses are further applied to key-signal generator 42, controlling that generator to develop corresponding bursts of key-signal energy which are modulated on the sound carrier in unit 25 and radiated to subscriber receivers.

The selected pulses applied to tube 30 intensity modulate the cathode-ray beam therein as it scans over anode segments 31 under the control of sweep system 34 which, in turn, is synchronized by the field-drive pulses obtained from generator 20. The sweep signal causes the beam of tube 30 to be incident upon an anode segment at the time of occurrence of any pulse, other than the first, supplied by divider 32 during each mode-determining interval. When the beam is thus energized by the presence of a selected pulse, a potential is developed across a load impedance (not shown) connected in circuit with the particular anode segment upon which the beam impinges at that moment. In this manner, the combination of pulses selected by divider 32 during any sweep cycle of tube 30 is effectively transferred to selector 36. A further selection of these pulses is accomplished in that selector in a manner which will be made more clear in the discussion of Figure 2. The pulses finally derived at the output terminals of selector mechanism 36 during any sweep cycle of tube 30, which is the interval referred to as a mode-determining interval, are supplied through amplifier 37 to counter 38 which counts the applied pulses. If the pulse count is even, a field-pulse is translated by gate circuit 39 at the end of that mode-determining interval with one polarity and is delivered to multivibrator 40. On the other hand, if the pulse count is odd, the field pulse is applied to the multivibrator with the opposite polarity. As a consequence, the multivibrator is actuated between its two operating conditions depending upon the nature of the pulse count in successive mode-determining intervals. This develops at the output terminals of the multivibrator a deflection-control signal which has amplitude excursions between maximum and minimum values as the multivibrator assumes first one and then the other of its operating conditions. This deflection-control signal is applied to coder 12 to vary the operating mode of the transmitter in accordance with a code pattern represented by the amplitude variations of the deflection-control signal. The function of delay line 41 is to reset the binary counter so that it is always in a reference operating condition at the start of each mode-determining interval. This operation of the entire encoding system is more particularly described, with the benefit of explanatory curves, in the above-identified Adler et al. application.

Figure 2:
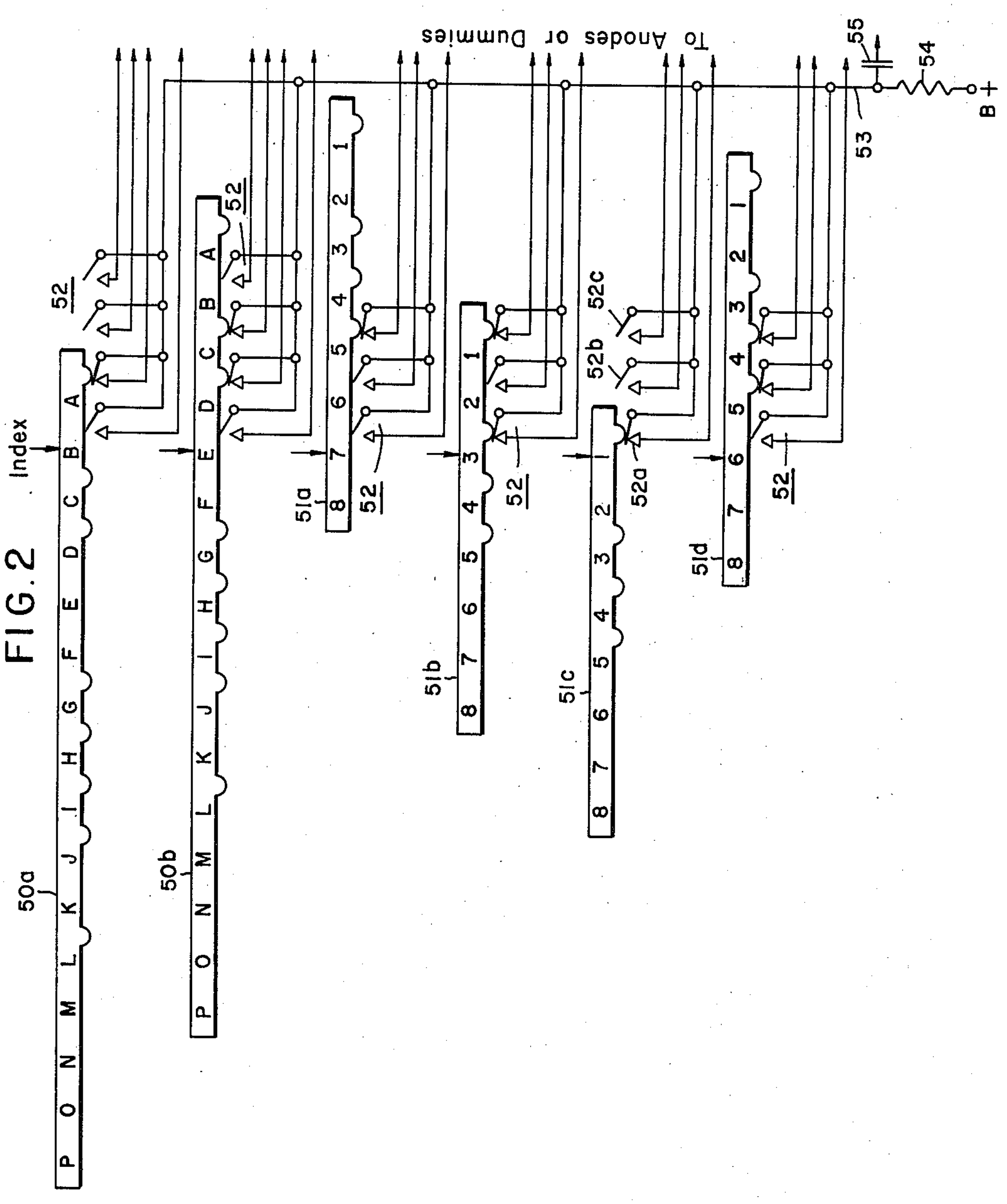
Figure 2 is a schematic representation of one portion of that encoding apparatus.

Consideration will now be given to the structural details and operating characteristics of the selector mechanism of the encoding system constructed in accordance with the present invention. In order to achieve a wide latitude and flexibility of the pulse selection, it is desirable that the selector mechanism include a large number N of encoding elements, such as switches, each having a number $m$ of operating positions. For convenience of explanation, it may be assumed that there are 20 two-position switches in the selector mechanism which is to achieve all possible encoding combinations permitted by that number of switches, a number of the order of a million. It will, of course, be understood for the specific transmitter described that the number of switch elements will correspond to the number of anode segments of tube 30 which is previously indicated as 20, even though for simplicity in the drawings only 12 have been represented. As shown in Figure 2, the selector 36 of the encoding mechanism is arranged in a plurality of groups 52 of similar switch elements individually representing $(m)^n$ possible switching combinations, where $m$ is the number of operating positions of the switch elements in any group and $n$ is the number of such elements included within any such group. More specifically, the first group or bank in Figure 2 has 4 two-position switches representing 16 possible switching combinations. The same is true of the second group. The remaining four groups individually include three two-position switches and each represents a maximum of eight switching combinations.

The selector mechanism further comprises a corresponding plurality of switch actuators individually associated with an assigned one of the switch groups 52 to effect actuation thereof and individually having $(m)^n$ operating positions each of which establishes a selected one of the possible switching combinations in its assigned group of switch elements. Thus, there is an actuator 50*a* associated with the first group of four two-position switches and it has 16 operating positions represented by the letters A through P inscribed along its length. A similar actuator 50*b* is associated with the next group of four two-position switches, while each of the groups of three switches is controlled by one of the eight-position actuators 51*b*—51*d*. The operating positions of the latter group of actuators are designated by arabic numerals inscribed along their lengths.

Each actuator has a pattern of bi-directional cam portions disposed along one peripheral portion in the manner indicated so that as each actuator is advanced through its range of positions with respect to a reference or index position, indicated by the vertically disposed arrow, the switches of its controlled group present in succession the complete range of possible combinations available therefrom. This may be most readily understood by reference to actuator 51*c* which is shown in its first operating position wherein two-position switch 52*a* is closed by the leading cam portion of the actuator while the remaining two-position switches 52*b* and 52*c* are open. The switching combinations achieved, as the actuator is advanced through its eight positions, are set forth in the following table:

| Actuator Position | Switches | | |
|---|---|---|---|
| | *52a* | *52b* | *52c* |
| 1 | C | O | O |
| 2 | O | C | O |
| 3 | C | O | C |
| 4 | C | C | O |
| 5 | C | C | C |
| 6 | O | C | C |
| 7 | O | O | C |
| 8 | O | O | O |

NOTE.—"C" represents a closed condition of the switch and "O" is an open condition.

It is apparent that relative movement of the actuators and their associated groups of switches is necessary to realize the full range of switching combinations, and while the description assumes that the actuator moves to bring its cam portions selectively into engagement with stationary switches, it is also possible to maintain the actuator stationary and move the groups of switches along a path intercepting the cam portions. It has been stated that the cam portions are bi-directional which means that both the leading and trailing edges of each cam portion have a sufficiently slow rate of change that the actuator may move in both directions relative to the controlled switches. This may be facilitated by providing the movable element of each switch with a roller spring-pressed against the actuator and serving the function of a cam follower. Moreover, where the switches are of the two-position type, as assumed thus far, the complete complement of possible switching combinations may be achieved through the use of a pattern of $(2)^{n-1}$ cam elements, where $n$ is the number of switches to be controlled by any particular actuator.

It is further apparent that where several groups of switch elements have the same number of switches, the actuators for all such groups have cam portions arranged in identical patterns.

In utilizing the selector mechanism of Figure 2 for unit 36 of Figure 1, the fixed contact of each two-position switch is connected by a lead to an assigned one of the elemental anodes 31 of tube 30. The movable contacts of each switch are connected to a common conductor 53 which extends through a load impedance 54 to a source of unidirectional operating potential indicated +B. A pulse component of potential, developed across impedance 54 when the beam of tube 30 impinges upon an anode which is coupled to source +B through the selector mechanism, is derived by way of condenser 55 for application to amplifier 37.

Figure 3:
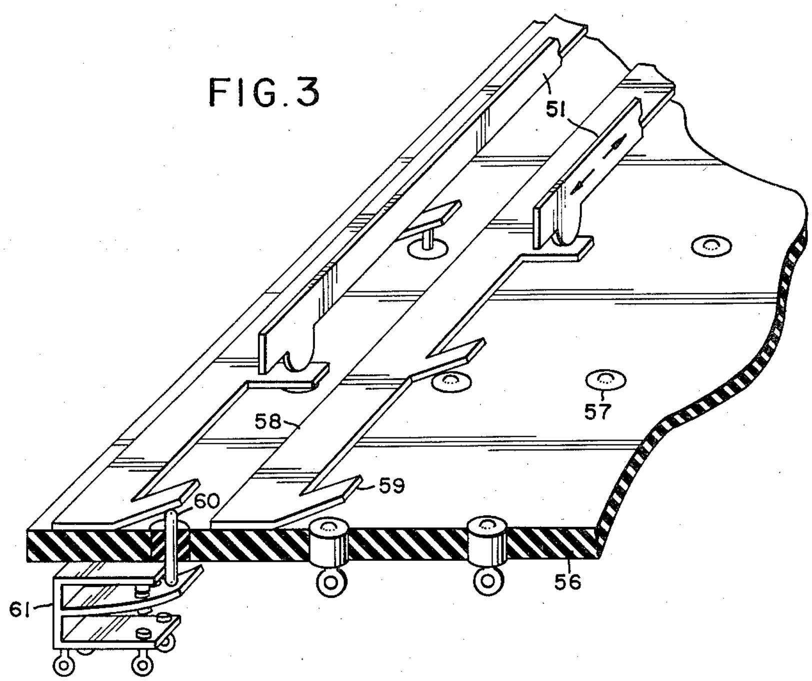
Figure 3 is a fragmentary view representing certain structural features of the arrangement represented schematically in Figure 2; while Figures 4, 5 and 6 individually illustrate modified forms of particular parts of the arrangement shown schematically in Figure 2.

Figure 3 represents a portion of a physical arrangement that may be adapted for the selector mechanism represented schematically in Figure 2. It includes a base member 56 of insulating material having a series of apertures 57. Where simple two-position make-break type switch elements are to be employed, the stationary contact is received by an aperture 57 with its contact portion projecting above the plane of base member 36. The terminal which may connect that contact to a selected segmental anode of tube 30 projects from the obverse side of the support member. The movable element of such switches may take the form of a conductive bar 58 having a series of projecting fingers 59 of spring steel. Preferably, the spring fingers 59 are silver-plated. In that case, the actuator 51 is mounted for reciprocating motion along a path which is intercepted by the spring fingers when in their undeflected positions and the cam portions of the actuators face that path to engage such fingers individually and selectively to close them upon their statonary contact elements.

Also, as represented in Figure 3, the selector mechanism may utilize double-pole double throw switches in which event a pusher pin 60, preferably of insulating material, is received by the apertures 57 of the base 56 for sliding engagement with the movable element of such a switch 61. The movable blade of the switch is normally biased to project pin 60 above the plane of the base so that it may be engaged by an overlying spring finger 59 to be displaced by the cam portions of the actuator 51.

In using the described selector mechanism to establish a particular coding schedule for a given subscription telecast, it is necessary selectively to adjust the several actuators controlling the family of groups of encoding or switch elements. As each actuator has a multiplicity of operating positions, it is necessary to assign a specific position to each for a given coding interval. The described arrangement lends itself to a most convenient designation of setting or adjustment for the selector. A six-component code call may be employed in a manner analogous to a telephone number in that the first two indicia are letters and the remaining four are numerals. For the specific adjustment represented in Figure 2, the selector call is BE–7316. As previously indicated, the identical encoding mechanism is employed in each subscriber receiver and each subscriber is given the call for the program in a convenient form for use. At the same time, the mechanism lends itself to such a wide range of combinations, even though the number of actuators required is only six, that breaking of the code by one who has the selector but not the necessary code call is rendered exceedingly difficult.

Figure 4:
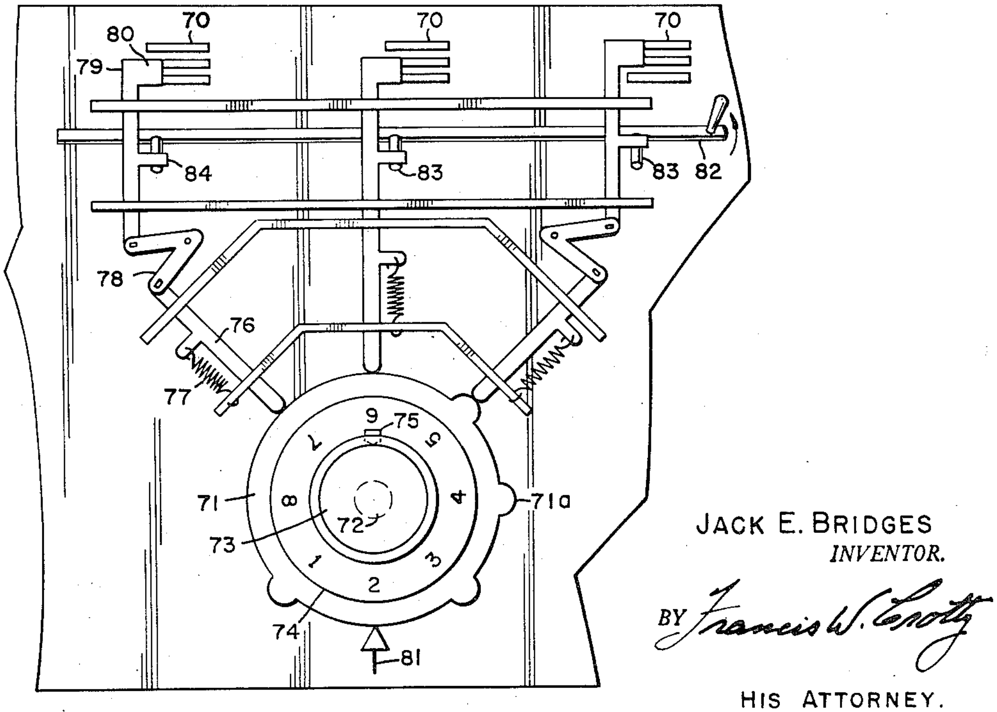

It may be desirable in constructing apparatus of the type in question to use rotary type actuators as distinguished from rectilinearly moving actuators in order to conserve space and further to enhance the secrecy. The switch-actuating mechanism of Figure 4 represents such a construction but has been limited to only one group of three switches and one actuating mechanism. Obviously, the number of such combinations to be used is determined by the capabilities desired of the selector mechanism and to convert the embodiment of Figure 2 to the type of structure represented in Figure 4 would require four actuating and switch assemblies of the type shown in Figure 4 and two additional ones individually having a group of four two-position switches and cam members with eight cam portions.

Referring now particularly to Figure 4, the arrangement illustrated comprises three two-position switches 70 which may be secured in well-known manner to a suitable support structure (not shown). The actuating mechanism, for achieving all maximum possible switching combinations afforded by such switches, includes a member 71 of generally cylindrical configuration supported upon a shaft 72 and affixed thereto in any desired manner such as by a key and slot locking connection. Member 71 preferably has an axially extending hub portion 73 which may be knurled to serve as a selector adjustment knob. Moreover, member 71 has a pattern of cam portions **71*a* disposed on its outer periphery with the same relative spacing as that shown in Figure 2 for actuators 51*b–d***. In each case where the actuator controls three two-position switches, it has eight operating positions and the cam pattern places one cam portion in each of three consecutive working positions of the actuator while a fourth cam portion is separated by another work position from either end of the first mentioned group of three.

An indexing member 74, bearing the indicia of eight operating positions, is mechanically coupled with member 71 preferably being arranged in adjustably fixed orientation in respect thereto. This may be accomplished by providing the index member with a cylindrical flange portion to overlap knob 73 and to be locked thereto by means of a set screw 75.

The switch actuating mechanism under consideration also includes three actuators, one for each of controlled switches 70. The actuators are identical in construction and only one need be described. Each actuator has a cam-following element 76 urged by means of a spring 77 into the path of movement of cam portions **71*a*. Each cam follower 76 is pivoted to a bell crank 78 which in turn is pivotally mounted on a suitable frame structure (not shown in detail). To the other arm of the bell crank is pivotally connected an arm 79 terminating in a contactor or brush 80 which overlies the leaf elements of its associated switch 70**.

When a cam portion **71*a* is presented to the cam follower 76 of any actuator, that actuator is displaced in a radial direction away from the axis of rotation of member 71 and pivots its bell crank to displace the switch contact 80 into overlapping engagement with the top and middle leaves of its associated two-position switch. This is the condition represented for the switch on the extreme right end of the gang of two-position switches in Figure 4. Alternatively, when the cam follower engages the low peripheral portion of member 71, its bell crank turns in an opposite sense and its contactor 80 bridges a middle and lower leaves of its controlled switch as shown at the opposite side of the figure. The relative positions of the several switch contacts 80 is, of course, determined by the operating position of member 71 in respect of its eight possible operating positions. The index 74 permits a subscriber having this type of structure in his encoding mechanism to know the effective operating position of the mechanism by observing the position of the index scale relative to the indexing arrow 81. It is particularly advantageous to have the index 74 rotatable relative to member 71 so that the designation of a particular switching combination for one subscriber is specifically different from that of another. For example, for the operating condition represented, the mechanism is in position number 2. By relieving set screw 75, index 74** may be adjusted so that the represented condition of the switch may be designated by any of the operating indicia 1–8, inclusive.

A bail 82, having a series of switch releasing projections 83, may be included in the mechanism to release all switch actuators from engagement with member 71 when it is desired to rotate that member and change its operating position. To that end, the projections 83 of the bail engage complementary projections 84 provided on elements 79.

It is also clear that were elements 79 to terminate in a bifurcation or the like, having a mechanical coupling connection with the intermediate leaf of its associate switch 70, that the switch may then be operated very conveniently as a reversing mechanism. Moreover, either end leaf of any switch may be omitted, to convert the switch elements to two-leaf two-position devices exhibiting either an open or a closed condition.

Figure 5:
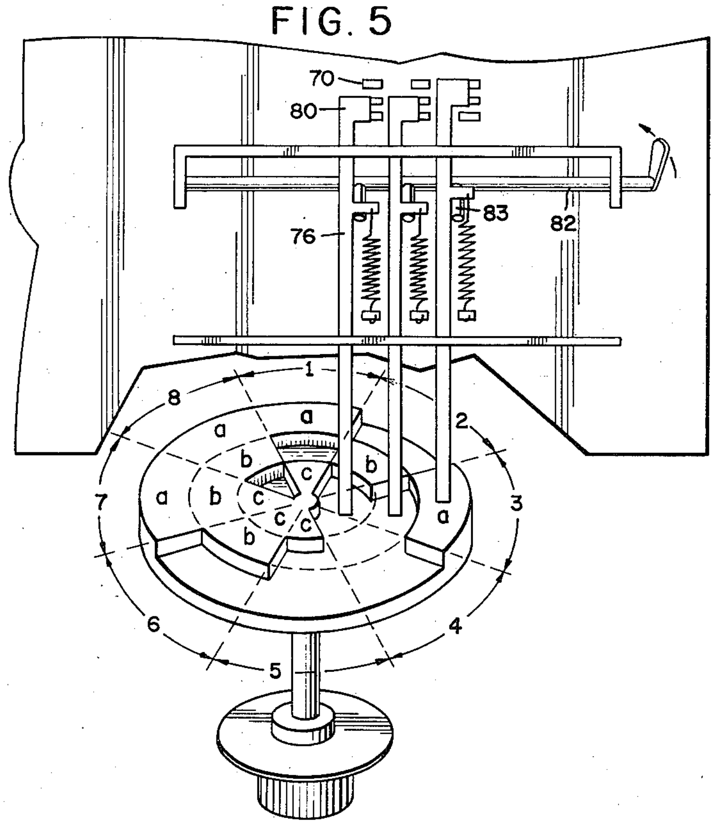

The actuating mechanism represented in Figure 5 is generally similar to that of Figure 4 and corresponding components thereof are identified by similar reference characters. The significant change in the structure of Figure 5 pertains to the makeup of member 71 which here uses cut-outs or recesses in place of the raised cam portions 72 of Figure 4. To facilitate an understanding of the cam pattern in Figure 5, three cam tracks *a*, *b* and *c* are outlined in broken-construction lines and radial construction lines set off the eight operating positions of the mechanism. Each of the actuators 76 is spring pressed towards an assigned one of these tracks to be advanced to the switch position shown for the switch 70 on the left of the gang when its actuating element 76 is received by a cam recess and to assume its alternate operating position when its actuator does not encounter a relieved or recessed portion of its associated cam track, a condition shown for the switch on the extreme end of the gang. It is obvious that the switch actuators of Figure 5 are also specifically different from those of Figure 4 in that each actuator is one continuous mechanical piece from its cam termination to its contactor 80, there being no need in this case for the bell cranks of Figure 4 which were there adopted because of the specifically different physical arrangement of the components of the actuating mechanism.

Figure 6:
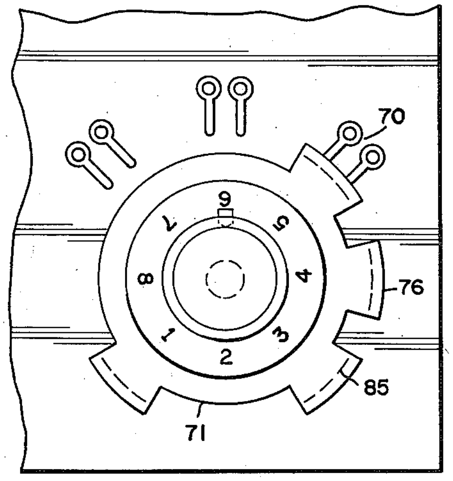

It is possible to integrate the switch actuators so that they effectively constitute part of the controlled switch gang. Such a modification is represented in Figure 6 which is generally similar to that of Figure 4 except that the cam portions now function as wiping contacts to bridge the two leaves of any of the switches 70 when member 71 is in an operating position that requires any of the controlled switches to be closed. It is preferable with a structure of this type to construct member 71 of insulating material and to provide a conductive strip 85 on each of its cam portions 76. This modified structure has the further advantage of avoiding the necessity for separate actuators which may be required when other types of switch elements are employed. If desired, member 71 may be conductive in which case it should, preferably, be insulated from its supporting structure. Then if a brush continuously engages member 71, the switches 70 may employ single leaf elements to be connected to the controlled circuits.

It has been convenient, in explaining the illustrated mechanisms, to refer to two-position elements although, obviously, one or more may have additional operating positions. The cam portions of the actuators would, in such a case, be designed to accommodate such other operating positions.

While particular embodiments of the invention have been shown and described, modifications may be made, and it is intended in the appended claim to cover all such modifications as may fall within the true spirit and scope of the invention.

I claim:

An encoding apparatus for a subscription type of communication system comprising: a plurality of groups of similar switch elements, each group representing $(m)^n$ possible switching combinations, where $m$ is the number of operating positions of each switch element in any group and $n$ is the number of such elements included within any such group; N separate input circuits each coupled to a different one of said switch elements; common signal-translating means connected to all of said switch elements; a corresponding plurality of switch actuators individually associated with an assigned one of said groups to effect actuation of the switch elements of such assigned group and having $(m)^n$ operating positions each of which establishes a selected one of said switching combinations in its assigned group of switch elements; and the total number of switch elements in all of said groups being equal to N.

References Cited in the file of this patent

UNITED STATES PATENTS

| | | |
|---|---|---|
| 2,124,160 | Wheelock | July 19, 1938 |
| 2,285,210 | Kempton | June 2, 1942 |
| 2,375,383 | Potts | May 8, 1945 |
| 2,376,846 | Field et al. | May 22, 1945 |
| 2,437,252 | Gould | Mar. 9, 1948 |
| 2,476,673 | May et al. | July 19, 1949 |
| 2,560,873 | Keckley | July 17, 1951 |